US012561730B2

(12) United States Patent
Vergidis

(10) Patent No.: US 12,561,730 B2
(45) Date of Patent: Feb. 24, 2026

(54) COLLABORATIVE AND INDEPENDENTLY RE-ENTRANT TRANSIENT ORDER SESSION MANAGEMENT

(71) Applicant: Charalabos Vergidis, West Chester, OH (US)

(72) Inventor: Charalabos Vergidis, West Chester, OH (US)

( * ) Notice: Subject to any disclaimer, the term of this patent is extended or adjusted under 35 U.S.C. 154(b) by 155 days.

(21) Appl. No.: 18/695,275

(22) PCT Filed: Sep. 28, 2022

(86) PCT No.: PCT/US2022/077163
§ 371 (c)(1),
(2) Date: Mar. 25, 2024

(87) PCT Pub. No.: WO2023/056287
PCT Pub. Date: Apr. 6, 2023

(65) Prior Publication Data
US 2025/0131489 A1 Apr. 24, 2025

Related U.S. Application Data

(60) Provisional application No. 63/261,735, filed on Sep. 28, 2021.

(51) Int. Cl.
G06Q 30/00 (2023.01)
G06Q 30/0601 (2023.01)
(Continued)

(52) U.S. Cl.
CPC ..... G06Q 30/0635 (2013.01); G06Q 30/0641 (2013.01); G06Q 50/12 (2013.01); G09G 3/344 (2013.01)

(58) Field of Classification Search
CPC .................................................. G06Q 30/0635
See application file for complete search history.

(56) References Cited

U.S. PATENT DOCUMENTS 6,873,970 B2 * 3/2005 Showghi ................ G06Q 30/06
705/26.81
11,436,584 B2 * 9/2022 Gordon ................ G06Q 20/326
(Continued)

FOREIGN PATENT DOCUMENTS

EP 3913563 A1 11/2021
KR 20210026352 A 3/2021
WO 2023056287 A1 4/2023

OTHER PUBLICATIONS

Intal, Grace Lorraine, et al. "Restaurant information system (RIS) with QR code to improve service operations of casual fine dining restaurant." 2020 IEEE 7th International Conference on Industrial Engineering and Applications (ICIEA). IEEE, 2020.*
(Continued)

*Primary Examiner* — Kathleen Palavecino
(74) *Attorney, Agent, or Firm* — Thompson Patent Law Offices PC

(57) ABSTRACT

Apparatus and associated methods relate to a dynamic session management engine (DSME). In an illustrative example, a DSME may include an electronic paper device configured to display a transient token associated with a session identifier (SID). The SID may be associated with a table of a patron party. For example, the electronic paper device may generate a passive display associated with the SID. User devices in a patron party, for example, may engage the passive display to associate the user device with the SID. When order items are transmitted from one of the user devices, the DSME may associate the order items with the transmitting device. The DSME may update each of the associated user devices dynamically to display a patron visual indicia associating the order item with at least one patron of the patron party. Various embodiments may advantageously provide a communal food ordering experience.

22 Claims, 10 Drawing Sheets

(51) Int. Cl.
    G06Q 50/12       (2012.01)
    G09G 3/34       (2006.01)

(56)                References Cited

U.S. PATENT DOCUMENTS

| | | | |
|---|---|---|---|
| 2013/0191229 A1 | 7/2013 | Rodgers et al. | |
| 2020/0042685 A1 | 2/2020 | Tussy et al. | |
| 2020/0167877 A1 | 5/2020 | Christensen et al. | |
| 2020/0184459 A1 | 6/2020 | Barman | |
| 2021/0241394 A1 | 8/2021 | Garrett et al. | |
| 2021/0312576 A1 | 10/2021 | Clarke | |
| 2023/0344931 A1* | 10/2023 | Church | G06Q 50/12 |
| 2024/0144350 A1* | 5/2024 | Bhatia | G06Q 30/0641 |

OTHER PUBLICATIONS

Chapter II Demand filed in related International Application No. PCT/US2022/077163, dated Jul. 28, 2023, 26 pages.
International Preliminary Report on Patentability in related International Application No. PCT/US2022/077163, dated Sep. 21, 2023, 18 pages.
International Search Report and Written Opinion of the International Searching Authority in related International Application No. PCT/US2022/077163, dated Dec. 21, 2022, 10 pages.
Papp, D, Hands On With A Batteryless E-Paper Display, Hackaday, accessed Sep. 26, 2022, https://hackaday.com/2020/06/17/hands-on-with-a-batteryless-e-paper-display/.

\* cited by examiner

300

400

COLLABORATIVE AND INDEPENDENTLY RE-ENTRANT TRANSIENT ORDER SESSION MANAGEMENT

CROSS-REFERENCE TO RELATED APPLICATIONS

This application is a national stage application under 35 U.S.C. 371 of and claims the benefit of PCT/US22/77163, titled "Collaborative and Independently Re-Entrant Transient Order Session Management," filed by Charalabos Vergidis on Sep. 28, 2022 which claims the benefit of U.S. Provisional Application Ser. No. 63/261,735, titled "Dynamic Hospitality Billing Session Management," filed by Charalabos Vergidis, on Sep. 28, 2021.

TECHNICAL FIELD

Various embodiments relate generally to dynamic session management.

BACKGROUND

When a party of patrons arrives at a restaurant, a host server may assign an available table to the party. After the party is seated, they may check a menu and ask a human server (e.g., waiter, waitress) to order food. The patrons may decide individually on the food ordered. The patrons sometimes may discuss among themselves before placing an order with the human server.

The server, after taking an order, may typically relate the order (e.g., by paper, by transmitting over a network) to a kitchen. The order may, for example, include the food items. The waiter may memorize and/or make a note to themselves of the table of the order and/or sometimes a seat corresponding to each ordered food item. In this way, when the ordered food is prepared, a server may try to remember where to deliver the food, for example. In some examples, a party may desire to order multiple "rounds" of food. The restaurant may aggregate all the food ordered into a single bill to be paid at the end of the meal. In some examples, when a meal is finished, payment may be provided by a single person or the bill may be split among the party.

SUMMARY

Apparatus and associated methods relate to a dynamic session management engine (DSME). In an illustrative example, a DSME may include an electronic paper device configured to display a transient token associated with a session identifier (SID). The SID may be associated with a table of a patron party. For example, the electronic paper device may generate a passive display associated with the SID. User devices in a patron party, for example, may engage the passive display to associate the user device with the SID. When order items are transmitted from one of the user devices, the DSME may associate the order items with the transmitting device. The DSME may update each of the associated user devices dynamically to display a patron visual indicia associating the order item with at least one patron of the patron party. Various embodiments may advantageously provide a communal food ordering experience.

Various embodiments may achieve one or more advantages. For example, some embodiments may advantageously provide secure, single-use tokens associated with a single session. Some embodiments may, for example, advantageously provide tokens which may require physical presence of a customer to open a session. Various embodiments may advantageously tie a session to one or more staff. For example, various embodiments may advantageously induce human touch and/or encourage staff and customer interaction in a (partially) self-service environment. Various embodiments may, for example, allow tipping of staff after service has been received in a self-initiated service environment. Some embodiments may allow a server to personally engage guests before they leave. In some embodiments, ratings and/or feedback per patron may be advantageously independently collected.

Various embodiments may, for example, advantageously provide an automatic order session management system that advantageously allows patrons to independently join the session without staff input, and/or without input from other patrons. For example, some embodiments may allow the patrons within a party to collaborate on the entire order on their own devices. Some embodiments may prevent malicious use of a previous and/or static order session, for example. For example, some embodiments may impose a unique one-for-all code for an entire meal for each patron party. Various embodiments, for example, may allow re-entry into the order session at any time.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a dynamic (hospitality) session management system is introduced with reference to FIGS. 1-2. Second, that introduction leads into a description with reference to FIG. 3 of an exemplary method of dynamic session management. Third, with reference to FIG. 4, an exemplary session management interface is disclosed. Fourth, with reference to FIGS. 5A-5C, the discussion turns to exemplary embodiments of displays generated in accordance with an exemplary dynamic session management system. Fifth, an exemplary method of order flow control is discussed with reference to FIG. 6. Finally, the document discusses further embodiments, exemplary applications, and exemplary aspects relating to dynamic session management.

Figure 1:
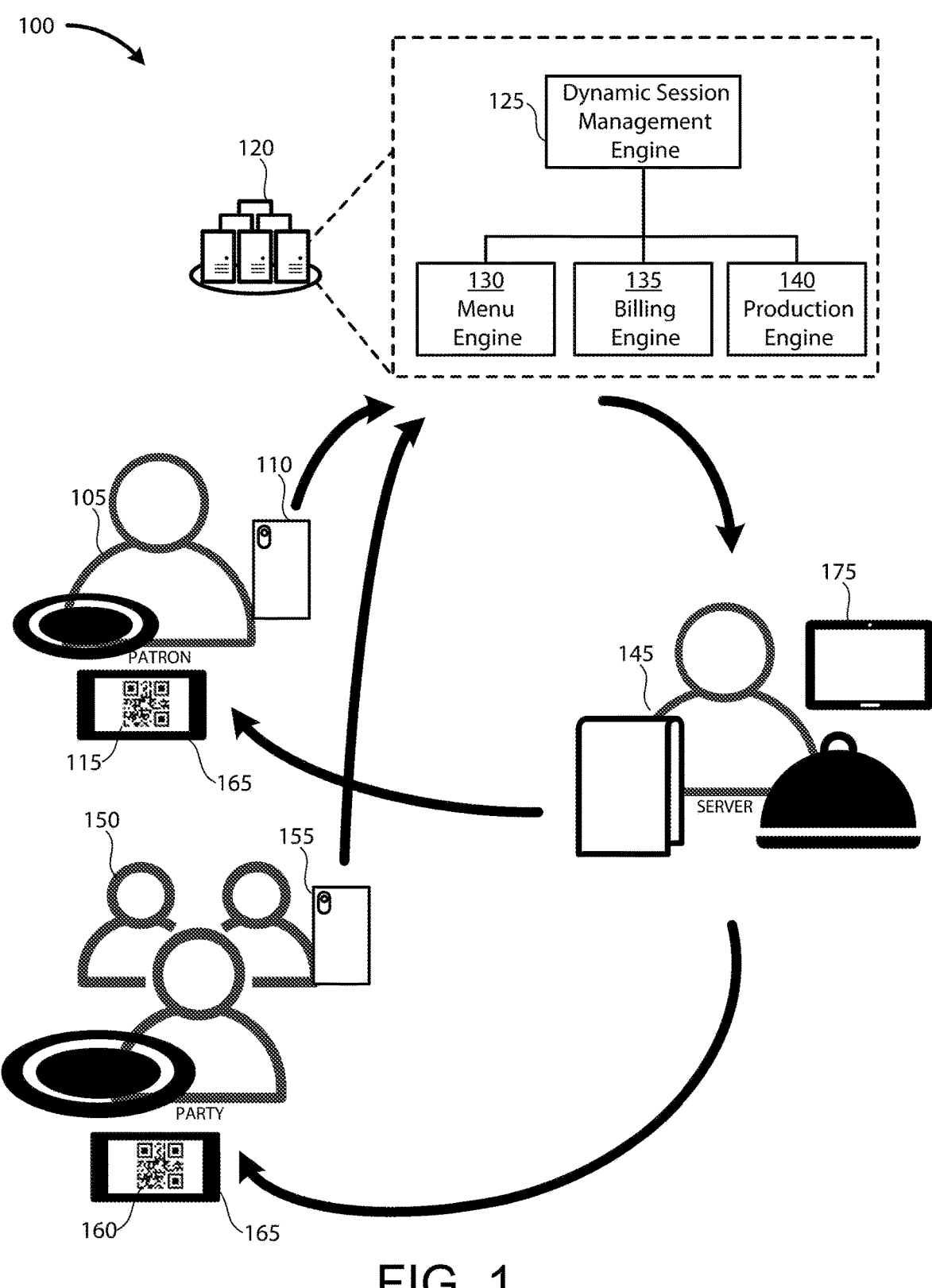
FIG. 1 depicts an exemplary dynamic session management engine (DSME) employed in an illustrative use-case scenario.

FIG. 1 depicts an exemplary dynamic session management engine (DSME) employed in an illustrative use-case scenario. In an illustrative use case scenario 100, a customer 105 (labeled "patron") in an exemplary hospitality environment (e.g., restaurant) operates a mobile computing device 110 (e.g., smartphone) engaging (e.g., scanning) a dynamic session token 115. The mobile computing device 110 interacts with a hospitality management system 120 (e.g., on one or more servers) via the token 115. The hospitality management system 120 includes a dynamic session management engine (DSME 125). The DSME 125 may, for example, identify a current session corresponding to the customer 105 based on the token 115. The token 115 may, for example, be unique.

In the depicted example, the DSME 125 is operably coupled to a menu engine 130, a billing engine 135, and a production engine 140. The DSME 125 may, for example, provide a menu (e.g., from the menu engine 130) to the mobile computing device 110 (e.g., in response to the customer 105 engaging the token 115 via the 110). The menu may, for example, be accessible without a dedicated app (e.g., via a web browser). The customer 105 may select items from the menu and add them to an order. The DSME 125 may communicate the items to the production engine 140 (e.g., to initiate preparation and/or serving of the ordered items). The DSME 125 may communicate at least a cost associated with the ordered items to the billing engine 135. For example, the DSME 125 may add the items to a current 'tab' (e.g., running amount due) associated with the customer 105 via the token 115.

A server 145 provides the ordered items (e.g., once prepared) to the customer 105. For example, the server 145 may be notified by the DSME 125 and/or the production engine 140 that the customer 105 has ordered. In some embodiments the server 145 may be notified by the DSME 125 and/or the production engine 140 that the items are ready to provide to the customer 105. In some embodiments the server 145 may be prompted (e.g., by the DSME 125) to interact with the customer 105 at least in response to (predetermined) events and/or at a request of the customer 105.

Once the customer 105 is finished, the customer 105 may be provided with a bill (e.g., generated in response to a signal(s) from the billing engine 135). The customer 105 may, for example, submit payment electronically. The customer 105 may, for example, request a ticket. In some examples, the customer 105 may access their current bill (e.g., tab) at any time by pressing a button on a menu/ordering interface screen. The customer 105 may, for example, be automatically billed after a (predetermined) period of time has elapsed since an item was added to the order associated with the token 115. Accordingly, various embodiments may advantageously provide customers a touchless ordering experience. Various embodiments may advantageously enable a customer to order multiple items during a visit. For example, a customer may asynchronously order throughout the visit without requiring payment for each item as it is ordered. A customer may, for example, advantageously pay once upon termination of a session associated with a token corresponding to the customer's visit. Various embodiments may, for example, advantageously prevent malicious actors from activating an order with no intention to pay.

In the depicted scenario, a party 150 of customers (e.g., 3 customers, as depicted) may interact with the DSME 125 via individual mobile computing devices 155 based on a dynamic session token 160. The token 160 may, for example, be distinct from the token 115. The token 160 may, for example, be associated specifically with the party 150. Members of the party 150 may communicate with the DSME 125 using the individual mobile computing devices 155 based on the token 160. For example, the individual mobile computing devices 155 may independently scan the token 160 (e.g., a quick response code) and be linked to the DSME 125. For example, all members of the party 150 may share a common 'tab' associated with their visit. Each member of the party (e.g., family members, business associates, friends) may add their individual order items to the common order associated with the token 160. In some implementations, the individual mobile computing devices 155 may be linked and unlinked with the DSME 125 by engaging the token 160 and disengaging using the user interface.

In some embodiments customers (e.g., customer 105, party 150) may, for example, only be (physically) able to access a respective token (e.g., token 115, token 160) when at a (predetermined) physical location. In some embodiments the customers may access a next available token, such as, for example, through a kiosk.

As an illustrative example depicted in FIG. 1, customers may be provided with a portable passive display device (PPDD 165) when they enter a building (e.g., a restaurant). In some embodiments a host/hostess may generate a unique code to be displayed on the PPDD 165 when the customer(s) arrive. For example, the PPDD may generate a new token in response to a signal (e.g., from hospitality staff, such as the host/hostess). In various implementations, the token 115 may be displayed on a portable low energy display (e.g., an electronic paper device). For example, the PPDD 165 may include an electronic paper display that consumes no power while the PPDD 165 is displaying a static image. For example, after the SID is deactivated, the PPDD 165 may regenerate a display to remove a displayed token that is uniquely corresponding to the deactivated SID. In various examples, the PPDD 165 may advantageously provide an easily and tangible accessible object for patrons to be linked to the DSME 125. For example, when a patron of the party 150 arrives late, the patron may not need to ask a server or other patrons at the table to share the token 160. The late patron may just engage the PPDD 165 at the table and start collaborating.

In some embodiments, a payment method may be associated with the token. For example, a customer's payment account such as a credit card may be required before initiating the order.

In various embodiments, for example, a token may be time-limited and/or use-limited. In various implementations, the token may be available for an entire meal for the party 150 so that regeneration of the token is unnecessary. A token may, for example, be associated with a physical location. The token may, for example, only be accessible at the physical location. Accordingly, various embodiments may advantageously allow a hospitality provider to begin an order on an open tab while reducing or eliminating a risk of a malicious actor from beginning an order from a remote location with no intention of completing the order (e.g., using a static token). Various embodiments may advantageously allow ordering on tab without requiring a user to install another app and/or join a specific network (e.g., a local network indicating physical presence of the customer). Such embodiments may, for example, reduce cost and/or information security hazards associated with providing a local network to customers.

In various embodiments, the token 115, 160 may be shared. For example, the party 150 may share a transient token displayed on the PPDD 165 within a whole meal. In an illustrative example, the party 150 may collaboratively order food and drink from, for example, a menu displayed on each of the individual mobile computing devices 155 of the party 150, after the mobile devices are linked to the DSME 125. During an order process, for example, the DSME 125 may display a user interface that dynamically displays food items currently placed in a shopping cart by each of the individual mobile computing devices 155. In various examples, the DSME 125 may advantageously offer a communal ordering experience to the party 150. In some embodiments, the guest may provide his/her seating location at the table. For example, the DSME 125 may associate each order item with a patron and a seat of the patron.

In some implementations, the server 145 may include a server device 175 to operate on orders placed by the customer 105 and/or the party 150. For example, the server device 175 may request a lock on an order associated with a token (e.g., the token 115 and/or the token 160) so that, for example, food items may not be added or removed from a list while an order is submitting to the production engine 140. For example, the lock may be placed to an order after a payment request is initiated.

In various examples, the server device 175 may override to help customers in edge scenarios. For example, a couple may be preferred to order using a single device but view their order of food separately. In this case, the server 145 may use the server device 175 to override and divide the ordered food items for them. For example, having the server device to override may advantageously keep a user interface at a customer side clean and easy to use.

In some examples, the user interface may include two tabs. For example, a shopping tab may include items in a "shopping cart" that has not been submitted. For example, a submitted tab may include items that has been submitted to the DSME 125. In some implementations, when the server device 175 is processing and/or modifying a submitted order of a SID, devices associated with the SID may be permitted to modify items in the shopping tab.

In various implementations, the DSME 125 may advantageously provide a robust transient token system to prevent people from ordering out of a desired location. As shown, because the tokens 115, 160 are transiently generated, expiring within a predetermined time, malicious use of the token to place a malicious order may be prevented without installation of geofence hardware and/or software. For example, a token may automatically be deactivated (e.g., 'expired') when a bill is closed (e.g., by waitstaff, by administration, automatically upon payment). In some examples, the DSME 125 may advantageously allow a user to keep an open tab while reducing or eliminating a risk of a malicious actor from beginning an order from a remote location with no intention of completing the order.

For example, if the remote malicious order is to be stopped by requiring each order placement be fully paid, an order placement system may not be able to display a communal experience having food items placed in a "shopping cart" grouped by each patron in the party 150.

In various embodiments, the DSME 125 may provide an automatic order session management system that advantageously allows patrons to independently join the session without staff input, and/or without input from other patrons. In some embodiments, the DSME 125 may allow the patrons within a party to collaborate on the entire order on their own devices. In some embodiments, the DSME 125 may prevent malicious use of a previous and/or static order session. In various embodiments, the DSME 125 may impose a unique one-for-all code for an entire meal for each patron party. Various embodiments may allow re-entry into the order session at any time.

Figure 2:
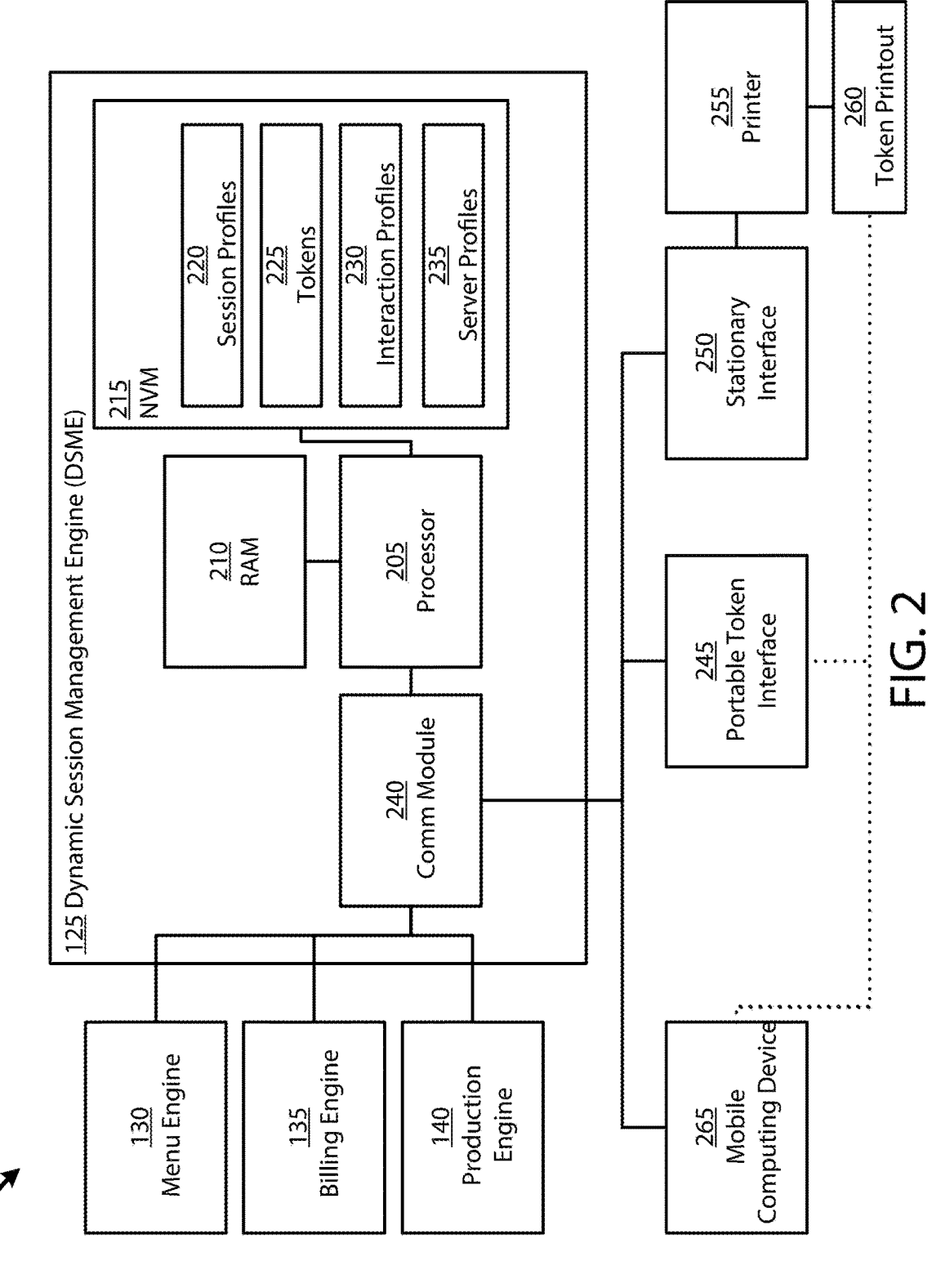
FIG. 2 depicts a block diagram of an exemplary DSME.

FIG. 2 depicts a block diagram of an exemplary DSME. In an exemplary hospitality management system 200, the DSME 125 includes a processor 205. The processor may, for example, include one or more processors. As depicted, the processor 205 is operably coupled to a random-access memory module (RAM 210). In various embodiments the RAM 210 may, for example, include one or more RAM modules. The processor 205 is operably coupled to a non-volatile memory module (NVM 215). In various embodiments the NVM 215 may, for example, include one or more data store modules and/or devices. For example, the NVM 215 may be provided with one or more programs of instructions configured to be executed on the processor 205. The program(s) of instructions may, when executed on the processor 205, cause the processor 205 to perform (dynamic) session management.

In the depicted example, the NVM 215 includes a session profiles data module 220. The session profiles data module 220 may, for example, include one or more data structures (e.g., metadata, files, components of a larger data structure) defining one or more corresponding sessions. A session profile may, for example, be associated with (e.g., contain, define, contain a reference to a location of) at least one token. The session profile may, for example, associated each token with at least one user and/or mobile computing device. The session profile may associate each session with at least one physical location (e.g., a hospitality provider location).

The NVM 215 further includes a tokens module 225. The tokens module 225 may, for example, include one or more data structures defining one or more tokens. Each token may be unique, for example. In some embodiments a token may be temporarily unique. For example, a token may only be used for one session at a time. A token may be geographically unique. For example, a token may only be used at one location at a time.

The NVM 215 further includes an interaction profiles module 230. The interaction profiles module 230 may, for example, include one or more data structures defining one or more interaction profiles. An interaction profile may, for example, associate one or more events which may occur during a session to one or more predetermined responses. In some embodiments an interaction profile may be configured such that signals are generated in response to a predetermined event. The signals may, for example, include prompts to a server, wait staff, production staff, billing, or some combination thereof. In some embodiments an interaction profile may be configured such that predetermined responses are associated with one or more incoming signals (e.g., customer arrival, customer pulls up menu, request help, order dinner item, order dessert item, order appetizer, customer pays for order).

The NVM 215 further includes a server profiles module 235. The server profiles module 235 may, for example, include one or more data structures defining one or more server profiles. A server profile may, for example, associate a server with one or more attributes (e.g., name, picture, predetermined responses). A server profile may, for example, be associated with a token in a session profile.

The processor 205 is further operably coupled to a communication module 240 (labeled "Comm Module"). The communication module 240, include one or more communication circuits, inputs, and/or outputs. The communication module 240 may, for example, be configured to provide wired and/or wireless communication. In the depicted example, the communication module 240 is operably coupled to the menu engine 130, the billing engine 135, and the production engine 140.

The DSME 125 is operably coupled to a portable token interface 245 (e.g., the PPDD 165) by the communication module 240. The portable token interface 245 may, for example, be configured to generate a visual representation of a token (e.g., such as a token in the tokens module 225). In some embodiments the portable token interface 245 may be configured to generate a non-visible signal corresponding to a token. A mobile computing device 265 (e.g., laptop, smartphone, tablet, smart watch) may, for example, interact with the portable token interface 245 to obtain a token identification (ID). For example, the portable token interface 245 may generate a scannable code (e.g., barcode, QR code). The mobile computing device 265 may, for example, scan the code to determine a (unique) ID of the token. In some embodiments the portable token interface 245 may, for example, generate a (wireless) signal corresponding to the token (e.g., near-field communication signal, Bluetooth signal, optical signal, infrared signal, magnetic signal).

The mobile computing device 265 may communicate with the communication module 240 using the token. The processor 205 may operate to generate a session profile. For example, the processor 205 may determine whether the token presented by the mobile computing device 265 is a valid (e.g., existent, valid, active, available) token in the tokens module 225. The processor 205 may associate a server profile with the session profile. The processor 205 may apply one or more interaction profiles to events associated with the session profile.

The communication module 240 is, in the depicted example, operably coupled to a stationary interface 250. The stationary interface 250 may, by way of example and not limitation, include a human-machine interface at a hostess station. The stationary interface 250 may receive and/or generate a token ID in response to a new guest arriving (e.g., based on input from a hostess). In some embodiments, as depicted, the stationary interface 250 may, for example, operate a printer 255 such that a printed representation 260 (labeled "token printout") of the token is generated. The printed representation of the token may be presented to a new customer (e.g., guest).

In some embodiments the portable token interface 245 may be coupled to the communication module 240 via the stationary interface 250. For example, the stationary interface 250 may configure the portable token interface 245 according to a token associated with a session with which the portable token interface 245 is currently associated. For example, the portable token interface 245 may be assigned to a table and/or customer. The portable token interface 245 may, for example, reconfigurably display a QR code based on a current token.

Figure 3:
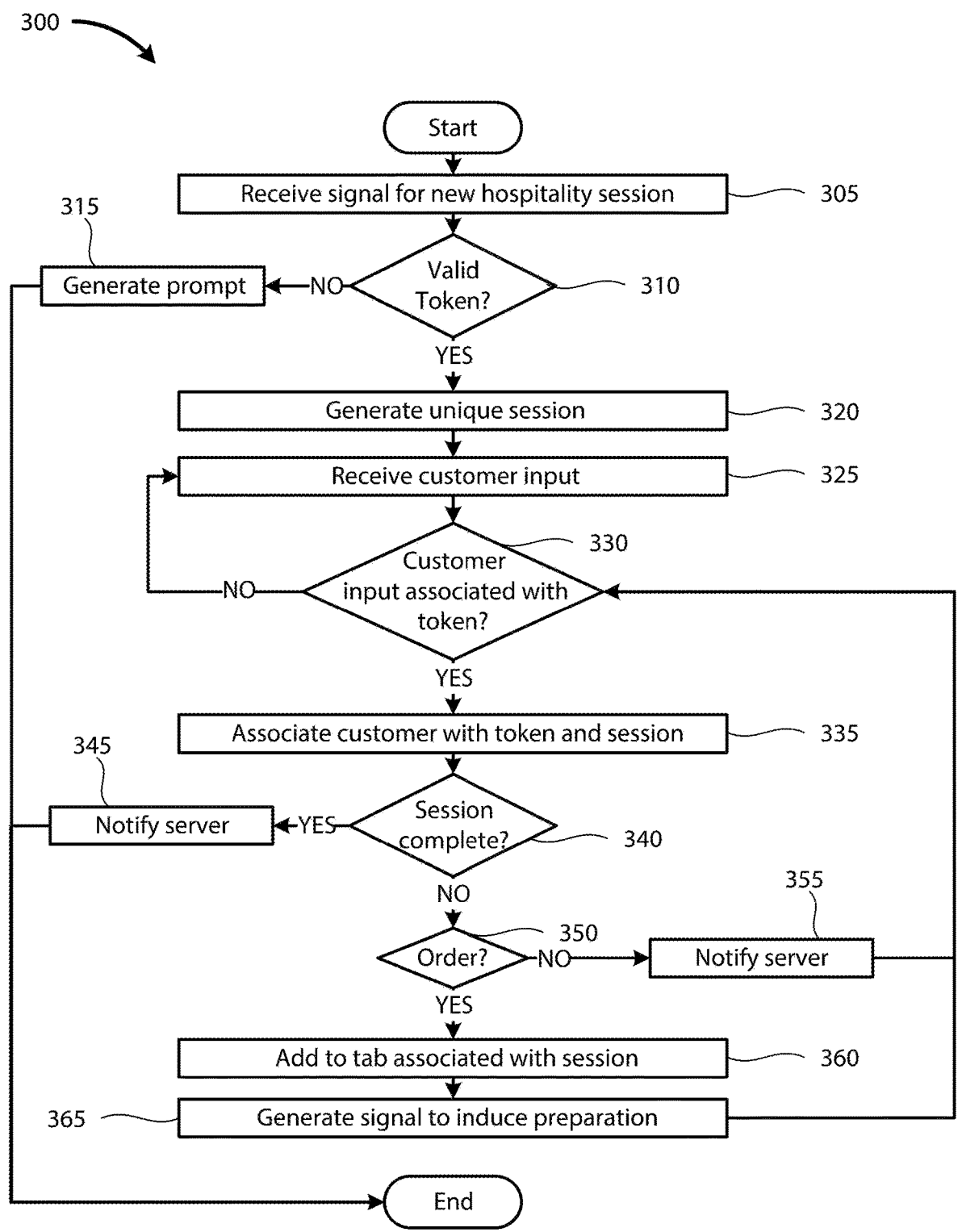
FIG. 3 depicts an exemplary method of dynamic hospitality session management using an exemplary DSME.

FIG. 3 depicts an exemplary method of dynamic hospitality session management using an exemplary DSME. In method 300 may, for example, be performed by a DSME 125. For example, the method 300 may be embodied is at least one program of instructions on the NVM 215. The method 300 may, for example, be executed at least partially by the processor 205.

In the method 300, a signal is received, in a step 305, for a new hospitality session. The signal may, for example, include an ID associated with a token. If a token is determined to not be valid, in a decision point 310, then a prompt is generated in the step 315 and the method 300 ends.

The token may for example not be valid if it is not present in the signal received in the step 305. The token may, for example, not be valid if it is not found to be a currently valid token (e.g., expired, not corresponding to a location associated with the signal received). The prompt in step 315 may be configured to generate a display for the originator of the signal indicating that the token was invalid.

If the token is determined, in the decision point 310, to be valid, then a unique session is generated in a step 320. For example, a session profile may be generated. A unique session identifier (USID) may uniquely identify the session profile. The token may be associated with the session profile. In some embodiments the USID may include the token. The token may, for example, serve as the USID.

Customer input is received in a step 325. The customer input may, for example, be received via a mobile computing device (e.g., mobile computing device 265, mobile computing device 110, individual mobile computing devices 155).

If customer input is received which is determined, in the decision point 330, to be not associated with the token (e.g., wrong token, no token included), then the method 300 returns to the step 325. If customer input is received which is determined, in the decision point 330, to be associated with the token, then the customer is associated, in a step 335, with the token and the session. For example, the step 335 may be performed when a new customer joins a group associated with a single session (e.g., another member of the party 150 joins an order). In some embodiments the step 335 may, for example, be omitted. In some embodiments the step 335 may, for example, be performed only when a customer with the token is not received. In some embodiments the step 335 may be time limited (e.g., only available for a predetermined amount of time from generating a token). In some embodiments the step 335 may, for example, require validation and/or approval from a first customer associated with the token. Such embodiments may, for example, advantageously prevent surrounding customers from joining a session they are not entitled to (e.g., 'free-loading').

If the session is determined, in a decision point 340, to be complete, then a server is notified in a step 345 and the method 300 ends. In some embodiments, further steps may, for example, include generating a bill, processing a payment transaction, generating a receipt, or some combination thereof. The server may, for example, be notified according to an interaction profile in the interaction profiles module 230. The server may, for example, be associated with the token by a server profile from the server profiles module 235 associated with the session profile. The session may, by way of example and not limitation, be determined to be complete when a customer requests a bill. The session may, for example, be determined to be complete after one or more predetermined criteria are met (e.g., time elapsed with no item added to an order, customer leaves the building).

If the session is determined to not be complete, and the customer input (from the step 325) is determined, in a decision point 350, to not be an order of one or more items, then the server is notified in a step 355. For example, the input may be a request for assistance. The server may, for example, be notified according to the interaction profile(s) associated with the session.

If the customer input is determined, in the decision point 350, to be associated with an order, then the item(s) are added to a tab associated with the session in a step 360. For example, a signal(s) may be generated to a billing module (e.g., the billing engine 135). In some embodiments the tab may be maintained in a DSME, and then provided to a billing module when the session is determined to be complete (e.g., in the decision point 340).

Figure 4:
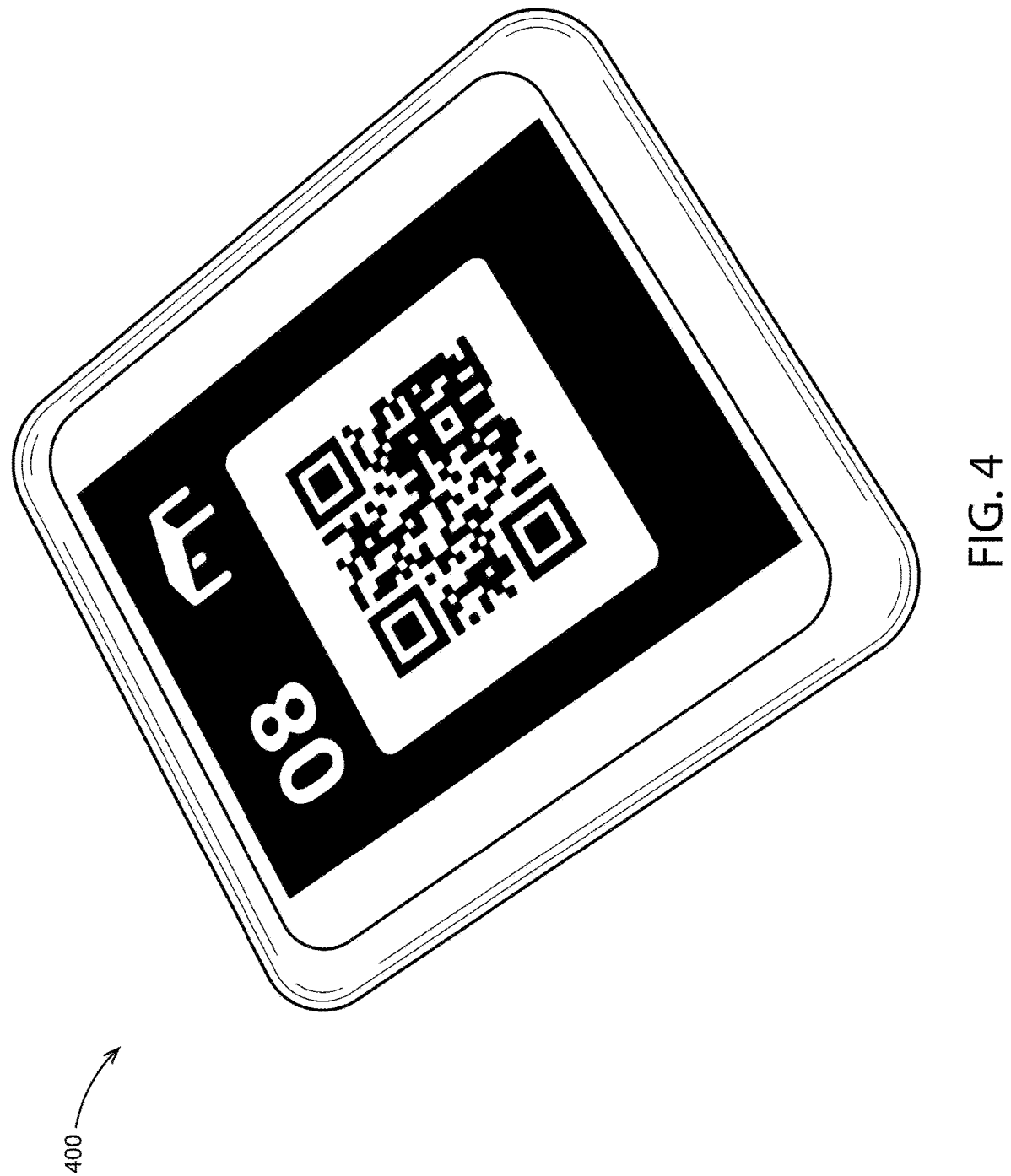
FIG. 4 depicts an exemplary portable token display configured to display a portable token according to an exemplary DSME.
Figure 5A:
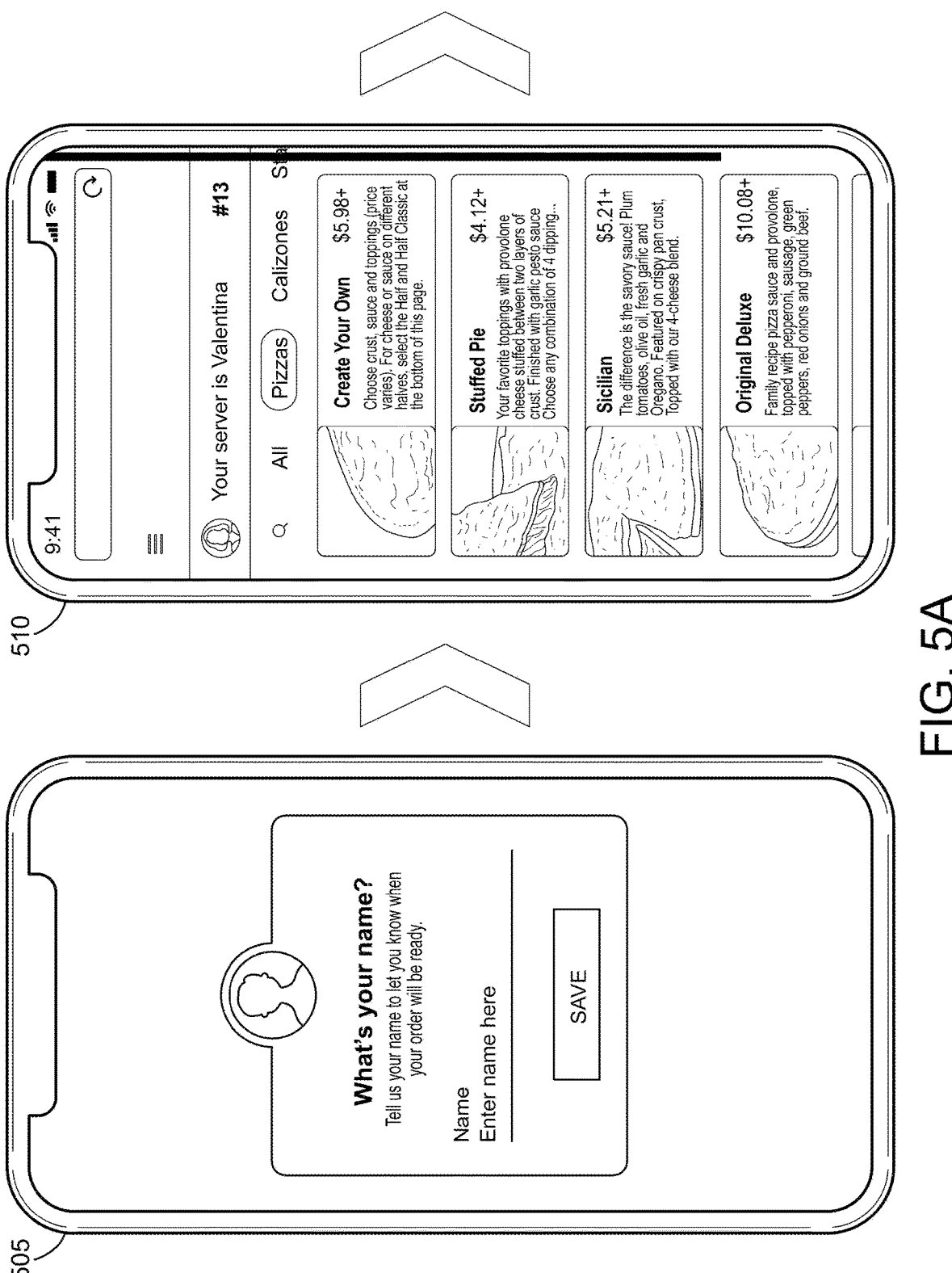
FIG. 5A, FIG. 5B, FIG. 5C, and FIG. 5D depict an exemplary sequence of displays corresponding to signals generated by an exemplary DSME.

A signal is then generated, in a step 365, to induce preparation of the items ordered. For example, a signal(s) may be generated to a production module (e.g., the production engine 140). FIG. 4 depicts an exemplary portable token display configured to display a portable token according to an exemplary DSME. A portable token interface 400 may, for example, include an e-ink device (e.g., including an e-ink display). For example, the e-ink device may display the portable token without consuming energy.

In some exemplary embodiments, when a guest arrives, a restaurant employee may select a table on a point of sale system (POSS) and select a server (restaurant employee) that will service the guest. The POSS may, for example, generate a unique QR code and link that code to the table where the guest(s) will be seated.

The QR code may, for example, include an address of the digital menu for the restaurant. The QR code may include a unique code to that session. The unique code may, by way of example and not limitation, include a representation of a random universally unique identifier (UUID), which may be referred to as a Globally Unique Identifier (GUID). This UUID/GUID may, by way of example and not limitation, be 128 bits long. Such embodiments may, for example, be difficult to generate by random guessing and/or brute-force attacks.

A restaurant employee (e.g., server) may seat a guest(s) at a table and place the portable token interface 400 at the table. The portable token interface 400 may, for example, include a communication module (e.g., configured for near-field communication (NFC)). In some embodiments, a printed representation 260 may be used.

For example, in some embodiments the portable token interface 400 may be at least part of the portable token interface 245. In some embodiments the stationary interface 250 may, for example, be portable (e.g., a smartphone running an app). The smartphone may receive and/or generate a code corresponding to a unique token. The smartphone may transmit the code to the portable token interface 400. The portable token interface 400 may, for example, (visually) display the code. The code may, for example, be a QR code (as depicted). A customer may, for example, scan the QR code to access a menu and initiate an order. The order may, for example, be closed out once the customer is finished. For example, the customer may order an appetizer. The customer may later order a meal. The customer may order drinks. The customer may later order a dessert. The customer may request a to-go container(s). The customer may then close out the order. The customer may, for example, tip staff members. A single transaction may be made to obtain payment for all parts of the order (e.g., including a tip). In various embodiments, the customer may engage with the same QR code without necessity to regenerate the QR code or a session ID.

In some embodiments the QR Code may include an address (e.g., unique resource identifier (URI)) of the restaurant's menu ordering system. The QR code may include a unique one-time use identifier for the table.

Upon scanning the QR code with their phone(s), the guest(s) phone may check with the database server to ensure the identifier encoded in the QR code represents an available table that is pre-loaded with the same identifier. The guest(s) phone may retrieve, from the database, the unique identifier, name and picture of a server that is associated with this restaurant table. In some embodiments a dedicated app may be launched. In some embodiments a web app may be launched through a (standard) web browser. Such embodiments may, for example, advantageously allow a customer to use the touchless ordering system without installing an additional app for each restaurant the customer visits.

FIG. 5A, FIG. 5B, FIG. 5C, and FIG. 5D depict an exemplary sequence of displays corresponding to signals generated by an exemplary DSME. For example, on successfully retrieving a session (e.g., including a server profile) generated in response to the QR code, the guest(s) may be asked for their name (or alias), as shown in display 505. Each guest seated at a table may, for example, use the same QR code to join a shared table order. In some embodiments, the guest may provide his/her seating location at the table.

A display 510 may then be generated. The display 510 may show a restaurant menu including, by way of example and not limitation, the server's name, picture, and table name the guest(s) are seated at. The guest(s) may browse the restaurant menu, modify items (e.g., customize), and place items in their order. Once at least one item is added to the order the screen may, for example, generate a prompt to the guest(s) to review their order.

Figure 5B:
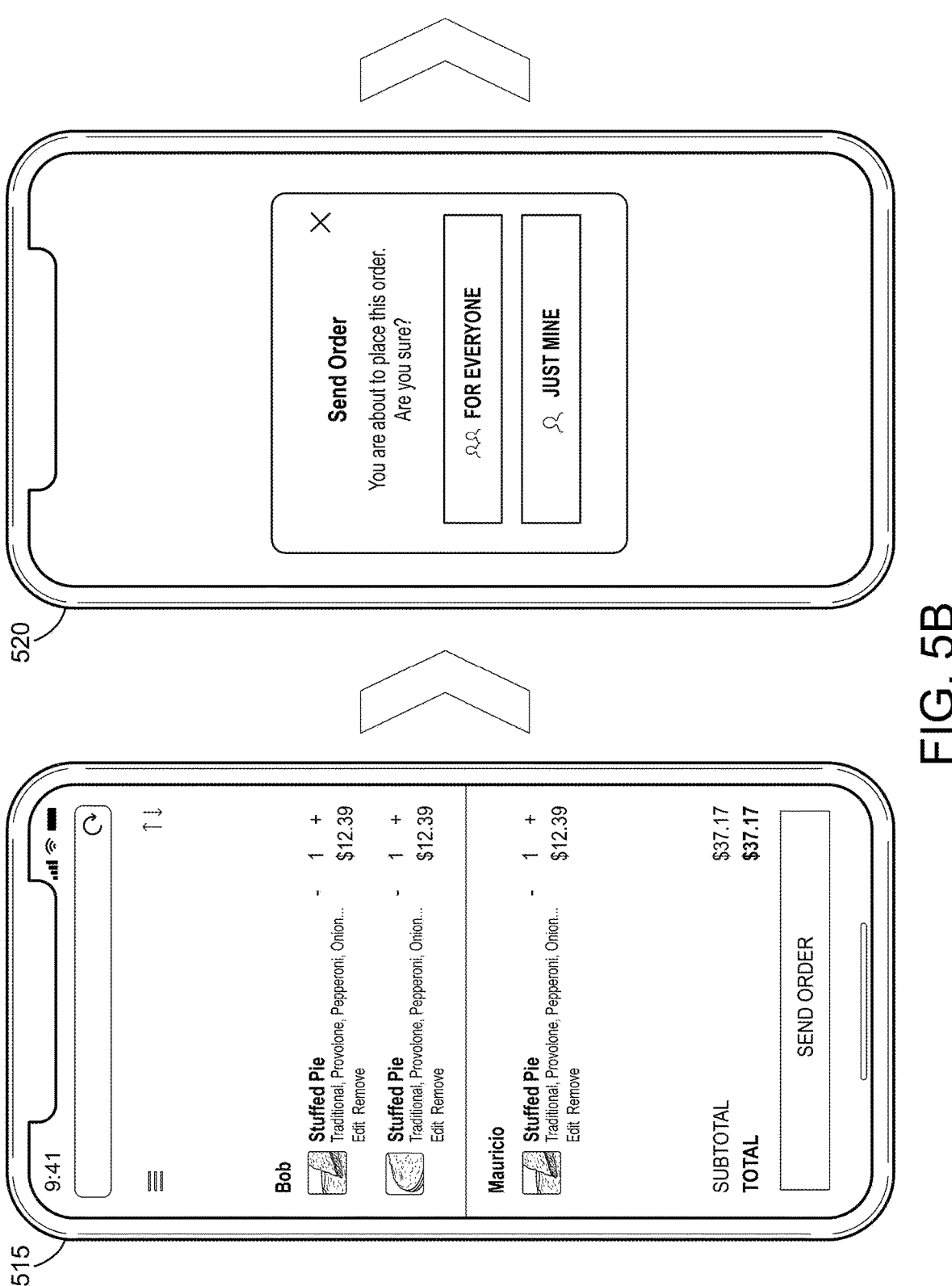

When a guest(s) checks their order, the display may, for example, be regenerated to include items entered by other people seated on the same table. The guest(s) may, for example, be presented with a button to place their order, as depicted in display 515 as shown in FIG. 5B. In this example, one of the guests may send, using a user interface 520, the order for everyone in a dinning party (e.g., the party 150) or just for himself/herself. Upon placing of the order, the server associated with this table may receive an in-app notification to alert them. Those notifications may, for example, advantageously be used as potential customer service touch points.

Figure 5C:
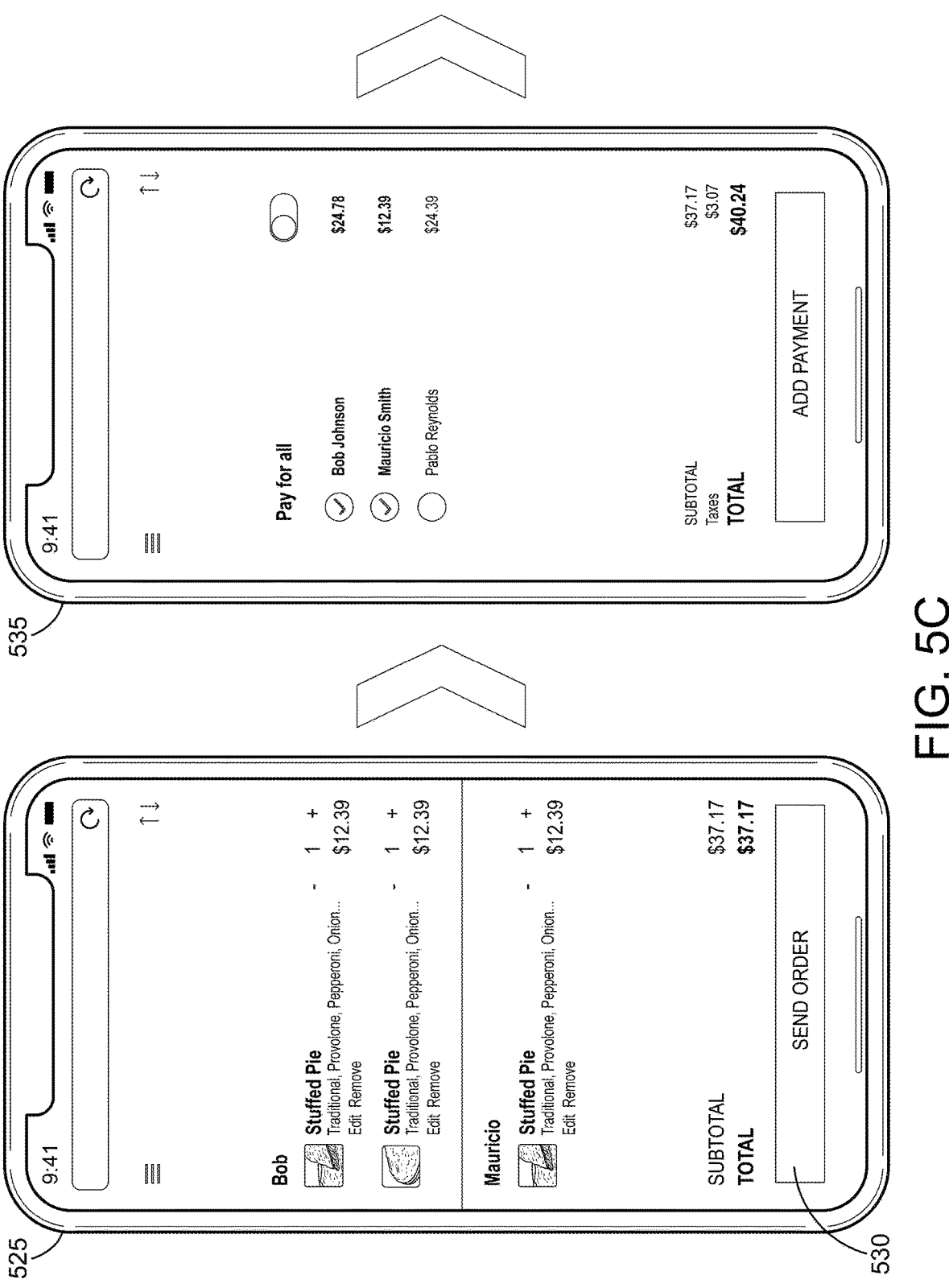

If the guest(s) don't have any new items in their order, they may be shown all the items they have ordered already and be presented with an option to pay for their order, as depicted in display 525 in FIG. 5C. Guest(s) may be able to refresh their cart automatically and/or manually in order to see items added by other guests. When ready to make a payment the guest may, for example, press the PAY ORDER button 530. As shown in a display 535, the guest may select one or more guests in the party to pay for.

Figure 5D:
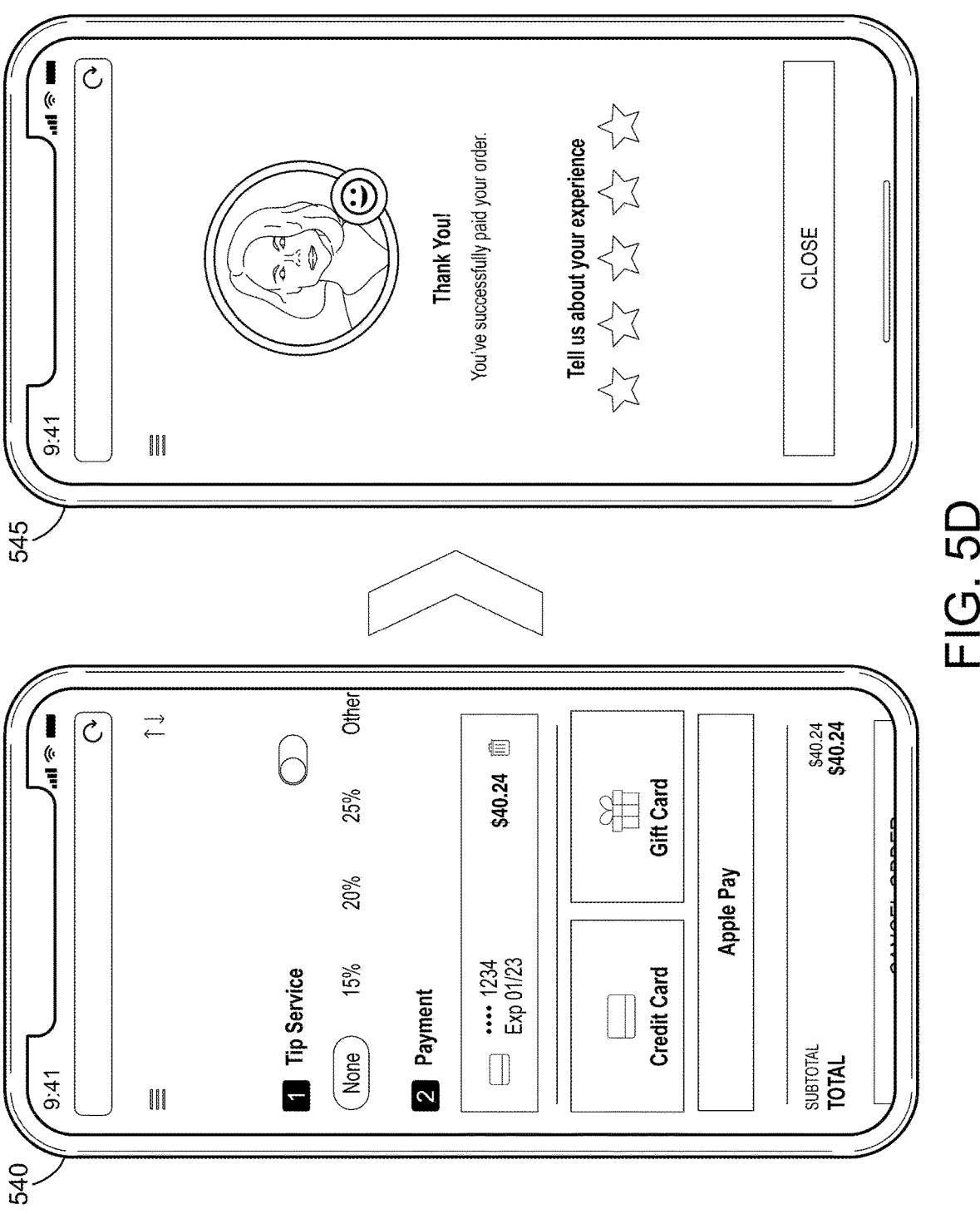

Upon selecting the guest to be paid, a display 540 is generated for the guest to select a type of payment, as depicted in display 540 in FIG. 5D. Upon completion of payment, the server who is attached to the order may receive an in-app notification on their phone. For example, the server may be prompted to stop by the guest(s)'s table and thank them for coming out. The guest(s) may be presented with a thank you screen and an opportunity to rate their server, such as depicted in a display 545.

In some implementations, the user feedback may include a granular guest satisfaction metric. For example, the granular guest satisfaction metric may include guest feedback associated with a unique session and items ordered by each guest. In an illustrative example, the user feedback may indicate that everyone except one guest is rating a five star. For example, a restaurant may investigate whether some of the food items ordered by the guest had turned bad.

Figure 6:
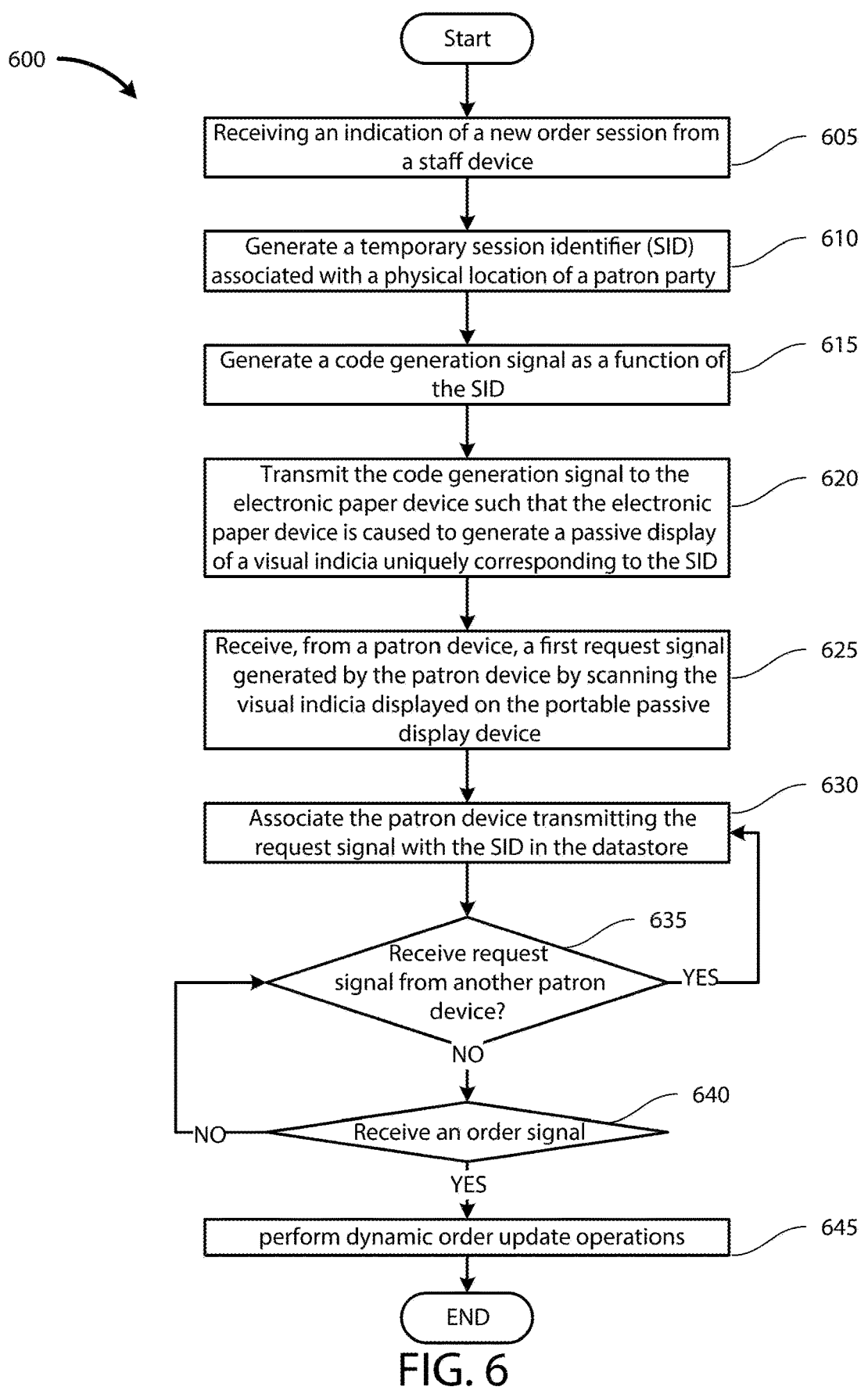
FIG. 6 depicts an exemplary method of dynamic order flow control using an exemplary DSME.

FIG. 6 depicts an exemplary method 600 of dynamic order flow control using an exemplary DSME. In this example, the method 600 begins when an indication of a new order session is received from a staff device in step 605. In step 610, a temporary session identifier (SID) associated with a physical location of a patron party is generated. Next, a code generation signal is generated as a function of the SID in step 615. For example, after the token is generated, the PPDD 165 maintains the passive display without electrical power as described with reference to FIG. 1.

In step 620, the code generation signal is transmitted to the electronic paper device such that the electronic paper device is caused to generate a passive display of a visual indicia uniquely corresponding to the SID. In step 625, from a patron device, a first request signal generated by the patron device by scanning the visual indicia displayed on the portable passive display device is received. In response to receiving the request signal, in step 630, the patron device transmitting the request signal is associated with the SID in the datastore.

In a decision point 635, it is determined whether a request signal is received from another patron device. If a request signal is received from another patron device, the step 630 is repeated. If no request signal is received from another patron device, in a decision point 640, it is determined whether an order signal is received. If no order signal is received, the decision point 640 is repeated. If an order signal is received, dynamic order update operations are performed in step 645 and the method 600 ends. For example, the dynamic order update operations may include a method as described with reference to FIG. 7.

Figure 7:
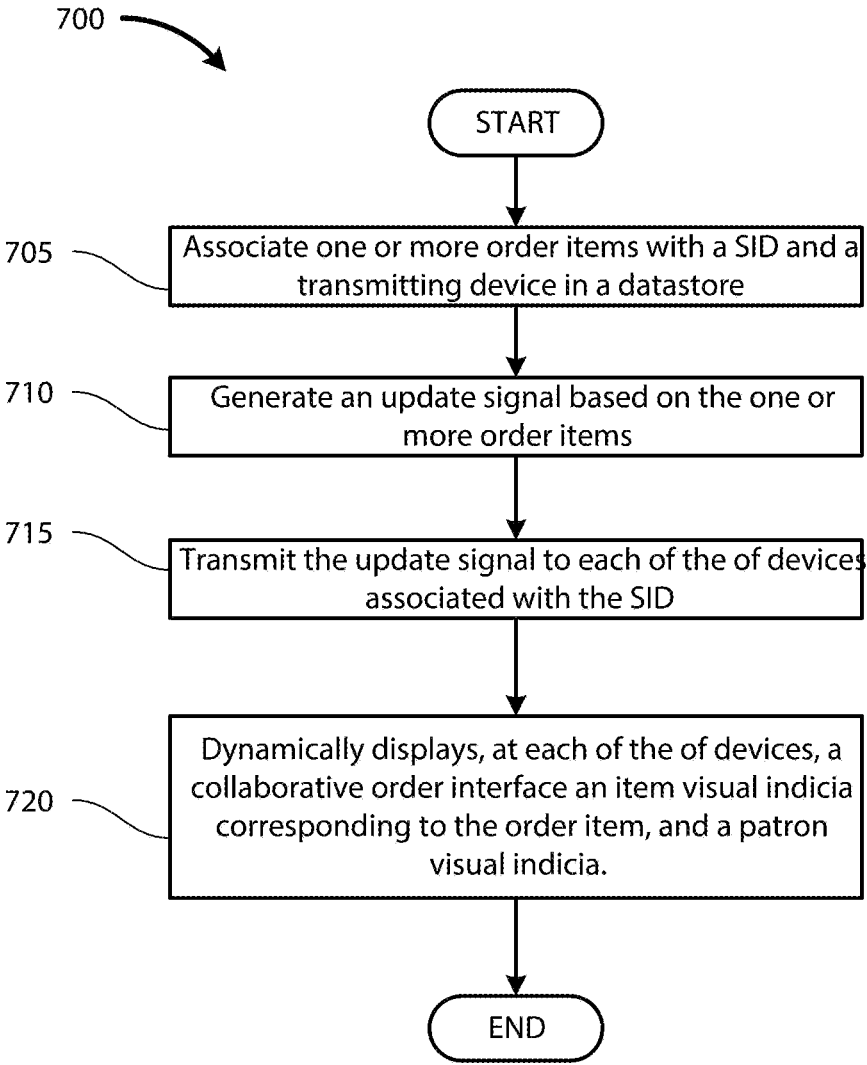
FIG. 7 depicts an exemplary method of dynamic order update operations using an exemplary DSME.

FIG. 7 depicts an exemplary method 700 of dynamic order update operations using an exemplary DSME. For example, the method 700 may be initiated when an order signal is received from a transmitting device among individual mobile computing devices 155 associated with the SID in the datastore (e.g., in the step 645 in FIG. 6). In step 705, one or more order items are associated with a SID and a transmitting device in a datastore. Next, in step 710, an update signal is generated based on the one or more order items. The update signal is transmitted to each of the devices associated with the SID in step 715. In step 720, at each of the devices, a collaborative order interface is dynamically displayed an item visual indicia corresponding to the order item, and a patron visual indicia, and the method 700 ends. For example, the patron visual indicia may be associated with the transmitting device, such that all items ordered by the multiple devices are dynamically displayed and grouped by corresponding ordering patron on each of the multiple devices.

Although various embodiments have been described with reference to the figures, other embodiments are possible. For example, in some embodiments a customer may be provided with a static code. The static code may, for example, include a QR code. The static code may, for example, correspond to a menu and/or ordering interface. A unique token code corresponding to a unique token may be provided (e.g., through a kiosk, by a hostess). The token code may, for example, include a 3-4 digit unique code. A customer may scan the static QR code. A DSME system may, for example, prompt the user to input a valid token code before initiating and/or confirming a session. The customer may, for example, not be allowed to order items until a valid code is provided. Such embodiments may, for example, allow static QR codes to be pre-printed, and a (dynamic) token code to be provided to the customer. In some embodiments the token code may, for example, be printed. The token code may, for example, be dynamically displayed. In some embodiments the token code may, for example, be displayed to a staff member and be written down by the staff member for a customer. Such an embodiment may, for example, enhance a 'personal touch' of a self-service environment. Some embodiments with a static code and a unique token code may, for example, be susceptible to brute force attacks. Some embodiments with a separate unique token code may, for example, require a user to perform additional step(s) to add an additional entry into their phone.

In some embodiments, a DSME may be configured to require location validation of a customer by geolocation. For example, the user may choose to verify physical presence by allowing a current location to be shared with the DSME. In some embodiments, a DSME may, for example, be configured to validate physical presence of a customer when a mobile computing device of the customer is connected to a local network associated with the physical location (e.g., guest WiFi network).

In various embodiments, a DSME may not require a code to be distributed from a server to advantageously reduce the number of waiters/servers needed at a restaurant. In some implementations, the user interface (e.g., the user interface described with reference to FIGS. 5A-5D) may include an assistant button so that a server of the table may be notified upon selecting the assistant button. In some implementations, the DSME may include rewards or loyalty programs for (associating with a mobile number or an email address, or a user device International Mobile Equipment Identity (IMEI)). For example, the DSME may allow a user to access the user's order history associated with the user.

In some implementations, upon associating with the user's device, the DSME may request the user to login with a phone number. In some examples, the DSME may ask for a phone number to create a profile. For example, the loyalty programs may provide discounts. For example, the loyalty programs may provide a tailor-made menu to allow guests to reorder and/or predetermined preferred dishes.

In some implementations, the DSME may transmit menus in different languages for a party based on user profile and/or user preference. For example, the DSME may automatically translate a menu based on a user preference.

Although an exemplary system has been described with reference to the figures, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

In an exemplary aspect, a system for allowing restaurant guests to start an order may include a secure, non-reproducible token. The system may be configured to allow a restaurant guest to order multiple items and pay at the end of a session. The system may be configured to induce a restaurant guest to interact with a server in a self-service environment. The system may be configured such that multiple guests may order from a restaurant on the same order and pay together or separately.

In an illustrative aspect, a system may include an electronic paper device including a device identifier. The system may include at least one host device configured to selectively communicate with the electronic paper device. The system may include a data store including a program of instructions. The system may include a processor operably coupled to the data store such that, when the processor executes the program of instructions, the processor causes operations to be performed to automatically generate a dynamic multi-user collaborative order interface across multiple user devices. The operations may include, in response to receiving an indication of a new order session from a staff device, generate a temporary session identifier (SID) associated with a physical location of a patron party including multiple patrons and store the SID in a datastore. The operations may include generate a code generation signal as a function of the SID and transmit the code generation signal to the electronic paper device such that the electronic paper device is caused to generate a passive display of a visual indicia uniquely corresponding to the SID. After the passive display is generated, the electronic paper device may, for example, maintain the passive display without electrical power. The operations may include, in response to receiving, from a first device corresponding at least to a first patron of the patrons, a first request signal generated by the first device in response to scanning the visual indicia displayed on the electronic paper device, associate the first device with the SID in the datastore. The operations may include in response to receiving, from a second device corresponding at least to a second patron of the multiple patrons, a second request signal generated by the second device in response to scanning the visual indicia displayed on the electronic paper device, associate the second device with the SID in the datastore. The operations may include, when an order signal corresponding to a selection of an order item from a predetermined list of options is received from a transmitting device of multiple devices associated with the SID in the datastore, the devices including the first device and the second device, then perform dynamic order update operations. The dynamic order update operations may include associate the order item with the SID and the transmitting device in the datastore. The dynamic order update operations may include generate an update signal based on the order item, and transmit the update signal to each of the multiple devices such that each of the multiple devices dynamically displays a collaborative order interface. The collaborative order interface may include an item visual indicia corresponding to the order item. The collaborative order interface may include a patron visual indicia associating the order item with at least one patron of the patrons. The at least one patron may be associated with the transmitting device. All items ordered by the multiple devices may be dynamically displayed and grouped by corresponding ordering patron on each of the multiple devices.

The passive display may be static for more than one order session associated with the same patron party and the table so that regeneration of the SID is unnecessary for an open tab including multiple orders. The SID may be deactivated for use after the open tab is closed.

The operations may include generate an order lock associated with the SID such that, when activated, a server device is enabled to modify ordered items associated with the SID while the patron devices are prevented from modifying the order.

The operations may include generate and transmit a signal to a staff device such that the staff device displays an order interface. The order interface may include at least one visual indicium for each of the items ordered grouped by patron. The order interface may include, for each patron, a visual indicium of a particular location at the table.

The electronic paper device may be configured such that, after the SID is deactivated, the passive display is regenerated to remove the visual indicia uniquely corresponding to the SID.

The operations may include, upon completing payment, display a feedback user interface at each of the multiple devices such that granular feedback from each of the multiple devices is independently received.

The operations may include upon receiving the first request signal, receive a user alias from the first device.

in an illustrative aspect, a computer-implemented method may be performed by at least one processor to automatically generate a dynamic multi-user collaborative order interface across multiple user devices. The method may include, in response to receiving an indication of a new order session from a staff device, generate a temporary session identifier (SID) associated with a physical location of a patron party including multiple patrons and store the SID in a datastore. The method may include generate a code generation signal as a function of the SID and transmit the code generation signal to a portable passive display device such that the portable passive display device is caused to generate a passive display of a visual indicia uniquely corresponding to the SID. The method may include, in response to receiving, from a first device corresponding at least to a first patron of the multiple patrons, a first request signal generated by the first device in response to scanning the visual indicia displayed on the portable passive display device, associate the first device with the SID in the datastore. The method may include, in response to receiving, from a second device corresponding at least to a second patron of the multiple patrons, a second request signal generated by the second device in response to scanning the visual indicia displayed on the portable passive display device, associate the second device with the SID in the datastore. The method may include, when an order signal corresponding to a selection of an order item from a predetermined list of options is received from a transmitting device of multiple devices associated with the SID in the datastore, the multiple devices including the first device and the second device, then perform dynamic order update operations.

The dynamic order update operations may include associate the order item with the SID and the transmitting device in the datastore. The dynamic order update operations may include generate an update signal based on the order item, and transmit the update signal to each of the multiple devices such that each of the multiple devices dynamically displays a collaborative order interface. The collaborative order interface may include an item visual indicia corresponding to the order item. The collaborative order interface may include a patron visual indicia associating the order item with at least one patron of the multiple patrons, the at least one patron being associated with the transmitting device, such that all items ordered by the multiple devices are dynamically displayed and grouped by corresponding ordering patron on each of the multiple devices.

The portable passive display may be static for more than one order session associated with the same patron party and table so that regeneration of the SID is unnecessary for an open tab including multiple orders. The SID may be deactivated for use after the open tab is closed.

The method may include generate an order lock associated with the SID such that, when activated, a server device is enabled to modify ordered items associated with the SID while the patron devices are prevented from modifying the order.

The method may include generate and transmit a signal to a staff device such that the staff device displays an order interface including at least one visual indicium for each of the items ordered grouped by patron. The order interface may include, for each patron, a visual indicium of a particular location of the patron within the physical location of the patron party.

The portable passive display device may include an e-ink display configured such that, after the passive display is generated, the portable passive display device maintains the passive display without electrical power. The e-ink display may be configured such that, after the SID is deactivated, the passive display is regenerated to remove the visual indicia uniquely corresponding to the SID. For example, a separate device (e.g., hostess station computer, point of sale management device, central server, waitstaff device) may automatically generate a signal (e.g., upon the SID being deactivated, upon a new SID being generated) causing the e-ink display to be reconfigured (e.g., blanked out, a new SID created).

The method may include, upon completing payment, display a feedback user interface at each of the multiple devices such that granular feedback from each of the multiple devices is independently received.

The method may include, upon receiving the first request signal, receive a user alias from the first device.

In an illustrative aspect, a computer program product (CPP) may include a program of instructions tangibly embodied on a non-transitory computer readable medium. When the instructions are executed on a processor, the processor may cause operations to be performed to automatically generate a dynamic multi-user collaborative order interface across multiple user devices. The operations may include, in response to receiving an indication of a new order session from a staff device, generate a transient session identifier (SID) associated with a physical location of a patron party including multiple patrons and store the SID in a datastore. The operations may include display a visual indicia on a tangible display device. The visual indicia may uniquely identify the SID. The operations may include, in response to receiving, from a first device corresponding at least to a first patron of the multiple patrons, a first request signal generated by the first device in response to scanning the visual indicia, associate the first device with the SID in the datastore. The operations may include, in response to receiving, from a second device corresponding at least to a second patron of the multiple patrons, a second request signal generated by the second device in response to scanning the visual indicia, associate the second device with the SID in the datastore. The operations may include, when an order signal corresponding to a selection of an order item from a predetermined list of options is received from a transmitting device of multiple devices associated with the SID in the datastore, the multiple devices including the first device and the second device, then perform dynamic order update operations.

The dynamic order update operations may include associate the order item with the SID and the transmitting device in the datastore. The dynamic order update operations may include generate an update signal based on the order item, and transmit the update signal to each of the multiple devices such that each of the multiple devices dynamically displays a collaborative order interface. The collaborative order interface may include (a) an item visual indicia corresponding to the order item, and (b) a patron visual indicia associating the order item with at least one patron of the multiple patrons, the at least one patron being associated with the transmitting device, such that all items ordered by the multiple devices are dynamically displayed and grouped by corresponding ordering patron on each of the multiple devices.

The tangible display device may include a portable passive display device. The portable passive display device may be static for more than one order session associated with the same patron party and table so that regeneration of the SID is unnecessary for an open tab including multiple orders. The SID may be deactivated for use after the open tab is closed.

The portable passive display device may include an e-ink display configured such that, after the passive display is generated, the portable passive display device maintains the passive display without electrical power. After the SID is deactivated, the passive display may regenerated to remove the visual indicia uniquely corresponding to the SID.

The operations may include generate an order lock associated with the SID such that, when activated, a server device is enabled to modify ordered items associated with the SID while the patron devices are prevented from modifying the order.

The operations may include generate and transmit a signal to a staff device such that the staff device displays an order interface including at least one visual indicium for each of the items ordered grouped by patron, and further including, for each patron, a visual indicium of a particular location of the patron within the physical location of the patron party.

The operations may include, upon completing payment, display a feedback user interface at each of the multiple devices such that granular feedback from each of the multiple devices is independently received.

The operations may include, upon receiving the first request signal, receive a user alias from the first device.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A system comprising:
an electronic paper device comprising a device identifier;
at least one host device configured to selectively communicate with the electronic paper device;
a data store comprising a program of instructions; and,
a processor operably coupled to the data store such that, when the processor executes the program of instructions, the processor causes operations to be performed to automatically generate a dynamic multi-user collaborative order interface across multiple user devices, the operations comprising:
in response to receiving an indication of a new order session from a staff device, generate a temporary session identifier (SID) associated with a physical location of a patron party comprising a plurality of patrons and store the SID in a datastore, wherein the SID uniquely identifies the new order session;
generate a code generation signal as a function of the SID and transmit the code generation signal to the electronic paper device such that the electronic paper device is caused to generate a passive display of a visual indicia uniquely corresponding to the SID, wherein after the passive display is generated, the electronic paper device maintains the passive display without electrical power;
in response to receiving, from a first device corresponding at least to a first patron of the plurality of patrons, a first request signal generated by the first device in response to scanning the visual indicia displayed on the electronic paper device, associate the first device with the SID in the datastore;
in response to receiving, from a second device corresponding at least to a second patron of the plurality of patrons, a second request signal generated by the second device in response to scanning the visual indicia displayed on the electronic paper device, associate the second device with the SID in the datastore;
when an order signal corresponding to a selection of an order item from a predetermined list of options is received from a transmitting device of a plurality of devices associated with the SID in the datastore, the plurality of devices comprising the first device and the second device, then perform dynamic order update operations, the dynamic order update operations comprising:

associate the order item with the SID and the transmitting device in the datastore;

generate an update signal based on the order item, and transmit the update signal to each of the plurality of devices such that each of the plurality of devices dynamically displays a collaborative order interface comprising:

(a) an item visual indicia corresponding to the order item, and, (b) a patron visual indicia associating the order item with at least one patron of the plurality of patrons, the at least one patron being associated with the transmitting device, such that all items ordered by the plurality of devices are dynamically displayed and grouped by corresponding ordering patron on each of the plurality of devices.

2. The system of claim 1, wherein the passive display is static for more than one order session associated with the same patron party and the table so that regeneration of the SID is unnecessary for an open tab comprising multiple orders, and the SID is deactivated for use after the open tab is closed.

3. The system of claim 1, wherein the operations further comprise:

generate an order lock associated with the SID such that, when activated, a server device is enabled to modify ordered items associated with the SID while the patron devices are prevented from modifying the order.

4. The system of claim 1, wherein the operations further comprise: generate and transmit a signal to a staff device such that the staff device displays an order interface comprising at least one visual indicium for each of the items ordered grouped by patron, and further comprising, for each patron, a visual indicium of a particular location at the table.

5. The system of claim 1, wherein the electronic paper device is configured such that:

after the SID is deactivated, the passive display is regenerated to remove the visual indicia uniquely corresponding to the SID.

6. The system of claim 1, wherein the operations further comprise:

upon completing payment, display a feedback user interface at each of the plurality of devices such that, granular feedback from each of the plurality of devices is independently received.

7. The system of claim 1, wherein the operations further comprise:

upon receiving the first request signal, receive a user alias from the first device.

8. A computer-implemented method performed by at least one processor to automatically generate a dynamic multi-user collaborative order interface across multiple user devices, the method comprising:

in response to receiving an indication of a new order session from a staff device, generate a temporary session identifier (SID) associated with a physical location of a patron party comprising a plurality of patrons and store the SID in a datastore, wherein the SID uniquely identifies the new order session;

generate a code generation signal as a function of the SID and transmit the code generation signal to a portable passive display device such that the portable passive display device is caused to generate a passive display of a visual indicia uniquely corresponding to the SID;

in response to receiving, from a first device corresponding at least to a first patron of the plurality of patrons, a first request signal generated by the first device in response to scanning the visual indicia displayed on the portable passive display device, associate the first device with the SID in the datastore;

in response to receiving, from a second device corresponding at least to a second patron of the plurality of patrons, a second request signal generated by the second device in response to scanning the visual indicia displayed on the portable passive display device, associate the second device with the SID in the datastore;

when an order signal corresponding to a selection of an order item from a predetermined list of options is received from a transmitting device of a plurality of devices associated with the SID in the datastore, the plurality of devices comprising the first device and the second device, then perform dynamic order update operations, the dynamic order update operations comprising:

associate the order item with the SID and the transmitting device in the datastore;

generate an update signal based on the order item, and transmit the update signal to each of the plurality of devices such that each of the plurality of devices dynamically displays a collaborative order interface comprising:

(a) an item visual indicia corresponding to the order item, and, (b) a patron visual indicia associating the order item with at least one patron of the plurality of patrons, the at least one patron being associated with the transmitting device, such that all items ordered by the plurality of devices are dynamically displayed and grouped by corresponding ordering patron on each of the plurality of devices.

9. The method of claim 8, wherein the portable passive display is static for more than one order session associated with the same patron party and table so that regeneration of the SID is unnecessary for an open tab comprising multiple orders, and the SID is deactivated for use after the open tab is closed.

10. The method of claim 8, further comprising:

generate an order lock associated with the SID such that, when activated, a server device is enabled to modify ordered items associated with the SID while the patron devices are prevented from modifying the order.

11. The method of claim 8, further comprising:

generate and transmit a signal to a staff device such that the staff device displays an order interface comprising at least one visual indicium for each of the items ordered grouped by patron, and further comprising, for each patron, a visual indicium of a particular location of the patron within the physical location of the patron party.

12. The method of claim 8, wherein the portable passive display device comprises an e-ink display configured such that:

after the passive display is generated, the portable passive display device maintains the passive display without electrical power, and after the SID is deactivated, the passive display is regenerated to remove the visual indicia uniquely corresponding to the SID.

13. The method of claim 8, further comprising:

upon completing payment, display a feedback user interface at each of the plurality of devices such that, granular feedback from each of the plurality of devices is independently received.

14. The method of claim 8, further comprises:

upon receiving the first request signal, receive a user alias from the first device.

15. A computer program product (CPP) comprising a program of instructions tangibly embodied on a non-transitory computer readable medium wherein, when the instructions are executed on a processor, the processor causes operations to be performed to automatically generate a dynamic multi-user collaborative order interface across multiple user devices, the operations comprising:

in response to receiving an indication of a new order session from a staff device, generate a transient session identifier (SID) associated with a physical location of a patron party comprising a plurality of patrons and store the SID in a datastore, wherein the SID uniquely identifies the new order session;

display a visual indicia on a tangible display device, wherein the visual indicia uniquely identify the SID;

in response to receiving, from a first device corresponding at least to a first patron of the plurality of patrons, a first request signal generated by the first device in response to scanning the visual indicia, associate the first device with the SID in the datastore;

in response to receiving, from a second device corresponding at least to a second patron of the plurality of patrons, a second request signal generated by the second device in response to scanning the visual indicia, associate the second device with the SID in the datastore;

when an order signal corresponding to a selection of an order item from a predetermined list of options is received from a transmitting device of a plurality of devices associated with the SID in the datastore, the plurality of devices comprising the first device and the second device, then perform dynamic order update operations, the dynamic order update operations comprising:

associate the order item with the SID and the transmitting device in the datastore;

generate an update signal based on the order item, and transmit the update signal to each of the plurality of devices such that each of the plurality of devices dynamically displays a collaborative order interface comprising:

(a) an item visual indicia corresponding to the order item, and, (b) a patron visual indicia associating the order item with at least one patron of the plurality of patrons, the at least one patron being associated with the transmitting device, such that all items ordered by the plurality of devices are dynamically displayed and grouped by corresponding ordering patron on each of the plurality of devices.

16. The CPP of claim 15, wherein the tangible display device comprises a portable passive display device.

17. The CPP of claim 16, wherein the portable passive display device is static for more than one order session associated with the same patron party and table so that regeneration of the SID is unnecessary for an open tab comprising multiple orders, and the SID is deactivated for use after the open tab is closed.

18. The CPP of claim 16, wherein the portable passive display device comprises an e-ink display configured such that:

after the passive display is generated, the portable passive display device maintains the passive display without electrical power, and after the SID is deactivated, the passive display is regenerated to remove the visual indicia uniquely corresponding to the SID.

19. The CPP of claim 15, wherein the operations further comprise:

generate an order lock associated with the SID such that, when activated, a server device is enabled to modify ordered items associated with the SID while the patron devices are prevented from modifying the order.

20. The CPP of claim 15, wherein the operations further comprise:

generate and transmit a signal to a staff device such that the staff device displays an order interface comprising at least one visual indicium for each of the items ordered grouped by patron, and further comprising, for each patron, a visual indicium of a particular location of the patron within the physical location of the patron party.

21. The CPP of claim 15, wherein the operations further comprise:

upon completing payment, display a feedback user interface at each of the plurality of devices such that, granular feedback from each of the plurality of devices is independently received.

22. The CPP of claim 15, wherein the operations further comprise:

upon receiving the first request signal, receive a user alias from the first device.

* * * * *